United States Patent [19]

Thomas et al.

[11] Patent Number: 5,262,123
[45] Date of Patent: Nov. 16, 1993

[54] FORMING METALLIC COMPOSITE MATERIALS BY URGING BASE MATERIALS TOGETHER UNDER SHEAR

[75] Inventors: Wayne M. Thomas; Edward D. Nicholas, both of Suffolk; Stephen B. Jones, Cambridge, all of England

[73] Assignee: The Welding Institute, Cambridge, England

[21] Appl. No.: 710,661

[22] Filed: Jun. 5, 1991

[30] Foreign Application Priority Data

Jun. 6, 1990 [GB] United Kingdom ............... 9012571
Jun. 6, 1990 [GB] United Kingdom ............... 9012572
Aug. 20, 1990 [GB] United Kingdom ............... 9018255

[51] Int. Cl.⁵ .............................................. B22F 3/20
[52] U.S. Cl. .................................... 419/67; 419/41
[58] Field of Search ................................ 419/67, 41

[56] References Cited

U.S. PATENT DOCUMENTS

| | | | |
|---|---|---|---|
| 4,397,622 | 8/1983 | Childs et al. | 419/67 |
| 4,419,324 | 12/1983 | Childs et al. | 419/67 |
| 4,484,876 | 11/1984 | Childs et al. | 425/79 |
| 4,505,878 | 3/1985 | Childs et al. | 419/67 |
| 4,552,520 | 11/1985 | East et al. | 425/79 |
| 4,963,320 | 10/1990 | Saito et al. | 419/12 |
| 5,015,439 | 5/1991 | Tyler et al. | 419/23 |

Primary Examiner—Donald P. Walsh
Assistant Examiner—Daniel Jenkins
Attorney, Agent, or Firm—Martin Novack

[57] ABSTRACT

A method of forming or reforming a composite material comprises relatively rotating a pair of members (2,3) while urging them together under pressure so as to mix or remix together the materials (1) making up the composite. The urging direction is substantially parallel with the axis of relative rotation. The composite is then extruded (7).

18 Claims, 8 Drawing Sheets

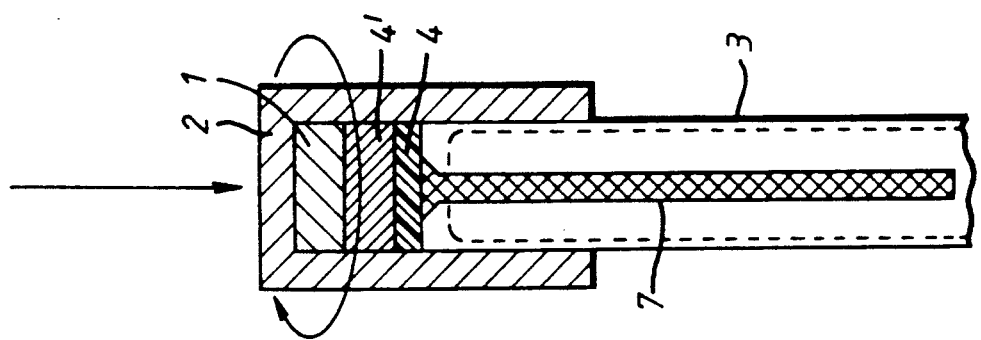
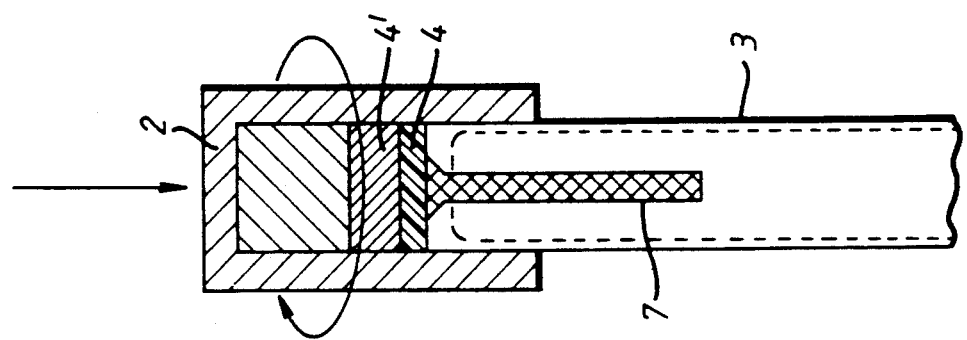
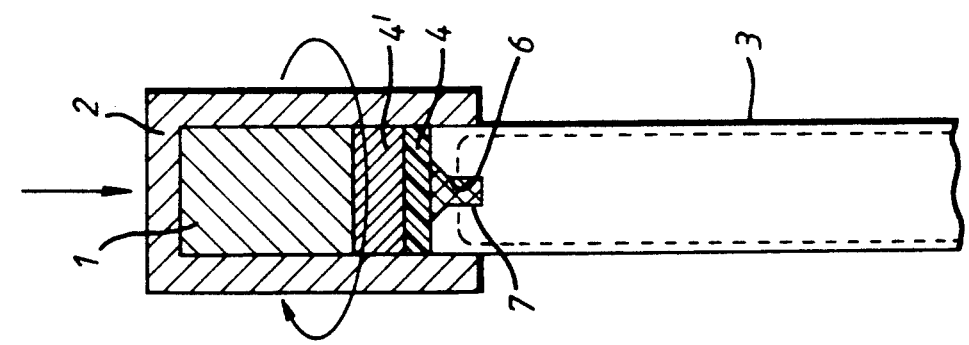
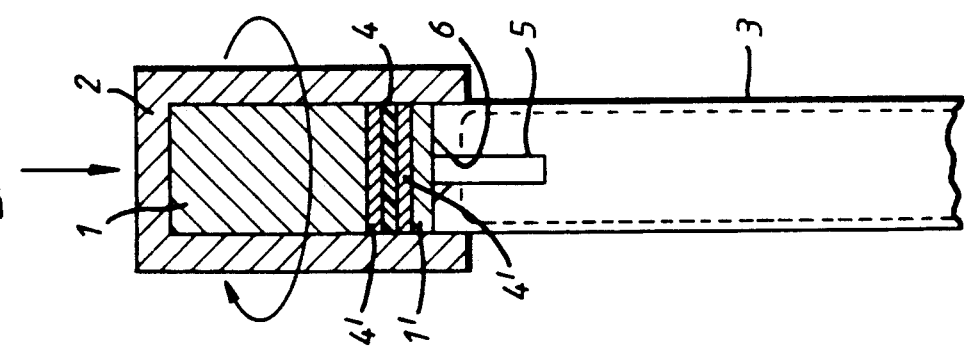

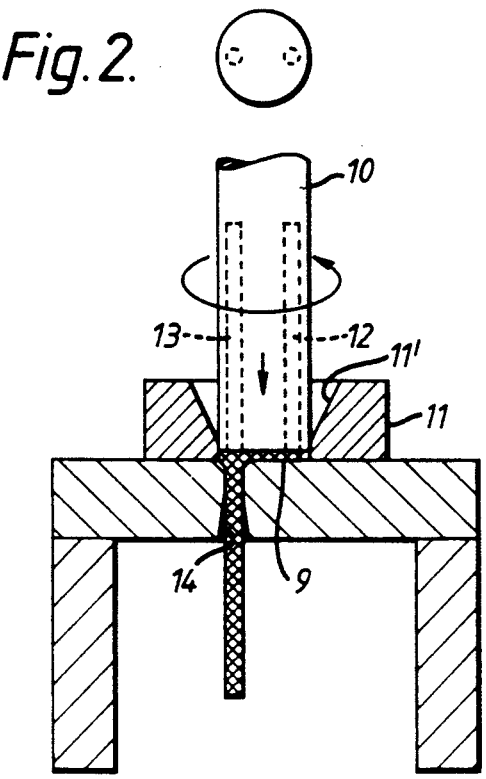
Fig. 2.
Fig. 3(A)    Fig. 3(B)    Fig. 3(C)
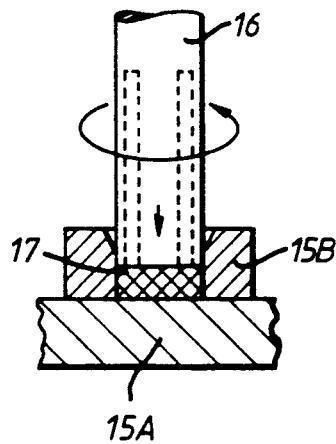
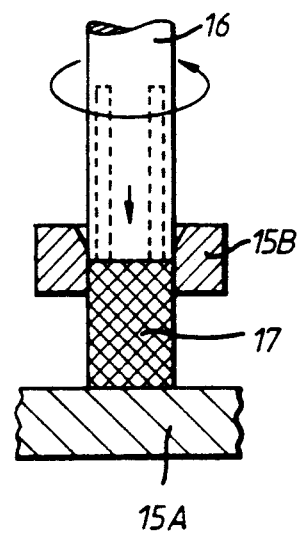

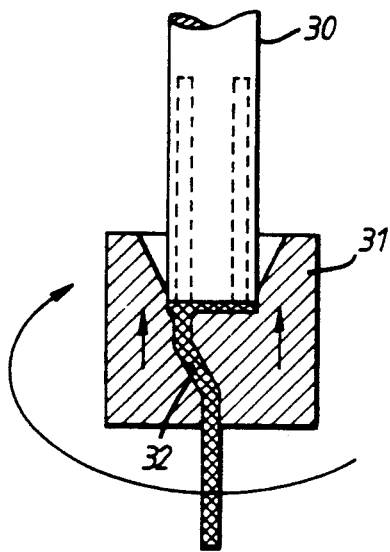
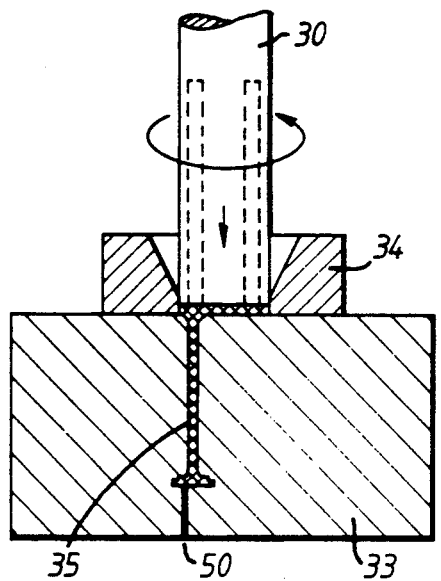
Fig. 9(B)

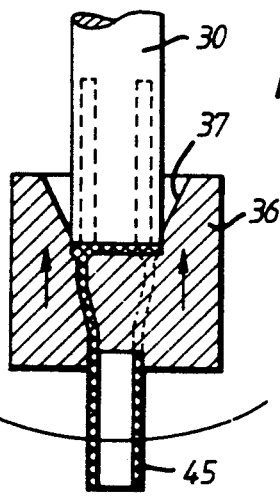
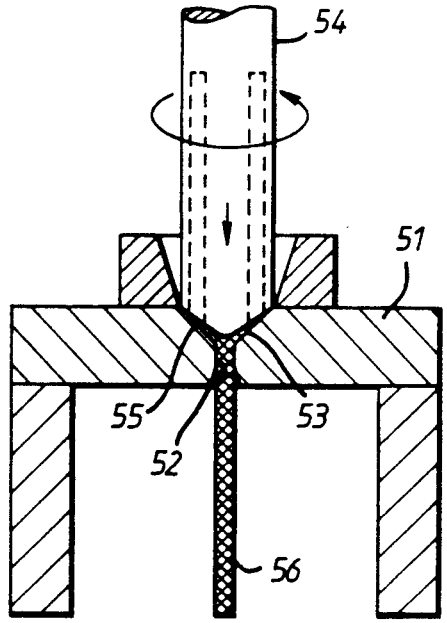

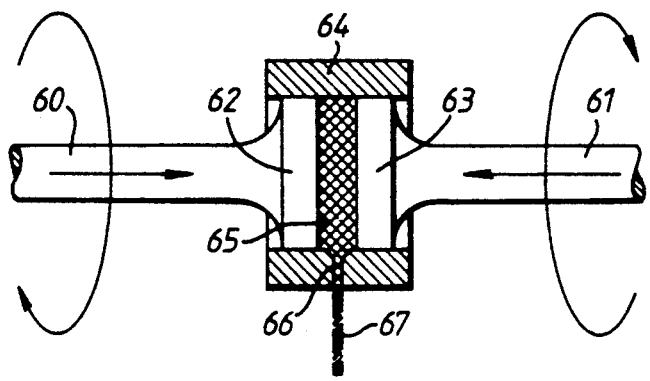
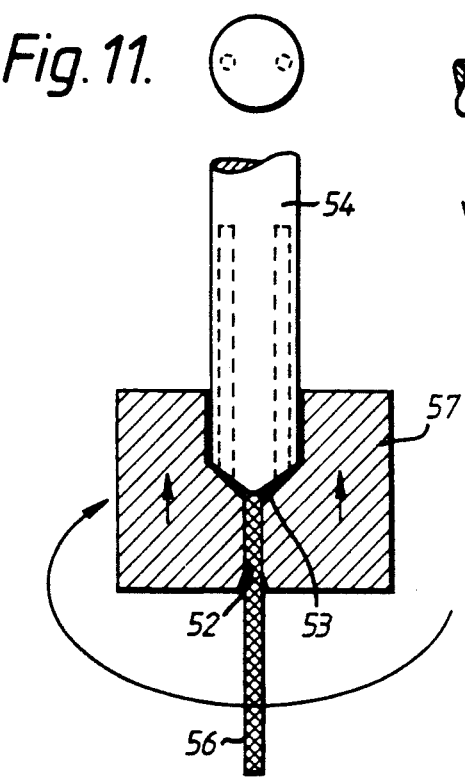
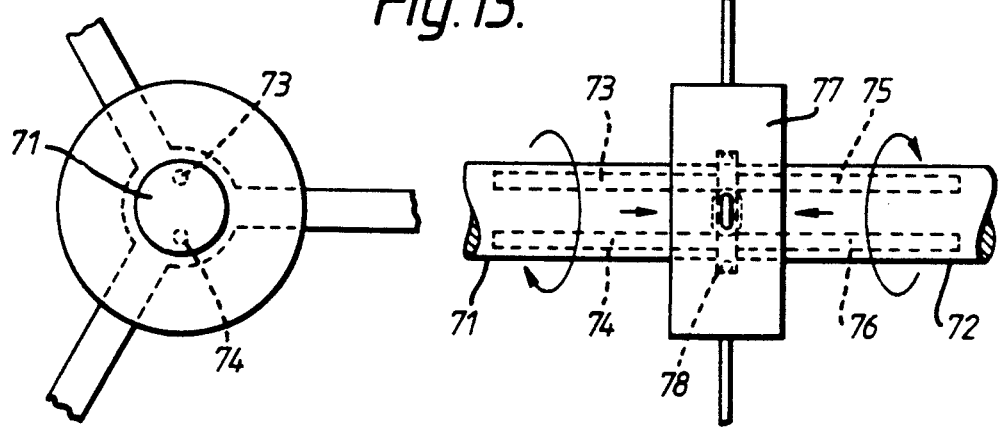

FORMING METALLIC COMPOSITE MATERIALS BY URGING BASE MATERIALS TOGETHER UNDER SHEAR

FIELD OF THE INVENTION

This invention relates to the forming or reforming of composite materials, for example extrusions of matrix materials including metal matrix composites (MMC). The invention also relates to the reforming of metallic (non-composite) members.

DESCRIPTION OF THE PRIOR ART

A friction forging process is described in "Friction Forging—A Preliminary Study" by D. R. Andrews and M. J. Gilpin, The Metallurgist and Materials Technologist, July 1975, pages 355-357. This describes the use of a die in a friction welding process to shape the resultant flash but is not concerned with extrusion.

Composite materials, particularly metal/ceramic combinations, have been formed in the past by melting the metal matrix and mixing in the desired non-metallic compound or ceramic. This approach, though reasonably successful, can lead to undesirable segregation of the non-melting constitutents in the molten metal matrix, and undesirable grain growth in the metal matrix on cooling below the liquidus.

Recently, a technique for forming composite material from powders has been described in "New Techniques In Powder Technology", Advanced Materials Journal, February, 1990, pages 21-24. In this case, powder is fed between a rotating extrusion wheel and a shoe urged against the wheel, the powder being compacted circumferentially against an abutment, the compacted powder then being extruded through a lateral opening of a die. This technique is not suitable for many types of composites such as combinations of powders and coarse particulates or even solid metals and alloys.

SUMMARY OF THE INVENTION

In accordance with one aspect of the present invention a method of forming or reforming a composite material comprises relatively rotating a pair of members while urging them together under pressure so as to mix or remix together the materials making up the composite, the urging direction being substantially parallel with the axis of relative rotation; and extruding the composite.

The invention is based on a friction welding or surfacing technique and is particularly suitable for forming a metal matrix extrusion. The formed composite material is extruded from a hot working zone which is maintained at temperature by shearing action and which is extruded due to the pressure applied.

Methods involving melting and/or casting a parent metal together with added composites have been practiced in the past but suffer from the difficulties of ensuring a reasonably even distribution, that is avoiding severe segregation, of the particulate material and from the relatively large grain growth especially with metals or alloys such as aluminium based, or copper based, in cooling from liquidus temperatures.

These problems are avoided by maintaining a heated zone in which the constitutents are mixed at a temperature below that at which the matrix melts, but which temperature is sufficiently high to allow substantially continuous shear in the parent material under conditions of applied loads. In this context the rate of movement for metallic materials in the shearing or plasticised layer exceeds 0.1 m/s over a substantial section of the plasticised material as viewed from a stationary or non-shearing part. Preferably the movement rate exceeds 0.5 m/S. Composite materials other than MMC can also be manufactured and extruded by those means such as non-miscible metal combinations for example aluminium tin as used for bearing materals. Equally non-metal combinations such as mixed glasses can be produced from suitable powders.

In some cases one of the members will comprise a consumable and, preferably the consumable member comprises a parent material and a particulate material, whereby the extrusion comprises a resulting matrix of the parent material. In other cases both members will be non-consumable with the parent materials placed in powder form between the members. In this case, one member may comprise a sleeve or cap while the other comprises a plunger fitting within the sleeve or cap with powder material between them. Alternatively, two members may cooperate together within a common sleeve.

Preferably, for consumable members, both members are elongate rods.

In some cases the composite is extruded through an opening in one of the members, the method further comprising separating the extrusion from the one member. In general, the extrusion will separate from the die or mould forming the one member during the extrusion process but occasionally a separate separation step will be required.

The invention utilises the effect of the rapid shear in the material at temperatures below that at which the material of the consumable member is liquid or melting. Where the consumable member includes parent and particulate materials this disperses the particles in a more finely divided form, and by the associated mechanical work to obtain a relatively finer grain in the matrix material. In particular the invention makes use of the frictional heat which is generated in rapid shear of the plasticised layer so in general avoiding the need for an external heat source. In some cases, however, electrical heating is desirable.

The methods according to the invention are based on the development of an adiabatic shear plane in material raised to above 90% of its melting point (°K), and on the application of pressure to extrude such sheared material, preferably as a continuous operation feed of the parent material. This technique according to the invention can be applied to the further refining of existing MMC as formed by prior known methods in which there is an unacceptable degree of segregation of the particulate material and/or grain growth in the metal matrix. Furthermore the technique can be applied to forming MMC from metal or alloy stock and suitable non-metallic materials such as ceramics or carbides in granular or powdered form. In an extreme example of the latter there is no prior dispersion of the particulate in the parent metal although the technique is equally applicable to the further refinement of MMC so produced as a preliminary operation. MMC can boost component stiffness, increase strength, produce vibration damping, reduce thermal expansion and improve wear resistance.

Examples of suitable ceramics are silicon carbide - SiC, silicon nitride - $Si_3N_4$, boron carbide - BC, titanium dioxide - $TiO_2$, boron nitride - BN, alumina - $Al_2O_3$, aluminium nitride - AlN, zirconia - ZrO$_2$ (transformation toughening), silica - SiO$_2$, and also compounds of ceramics i.e. sialon - Si$_3$N$_4$/AlN/Al$_2$O$_3$, and corundum - Al$_2$O$_3$+SiO$_2$. In particular the use of Zirconia (ZrO$_2$) provides crack inhibiting characteristics i.e. its localised 4–5% volumetric increase in particulate size caused by the stress in the immediate vicinity of the crack tip which will offer toughness as well as improved wear properties.

Other examples include intermetallic compounds such as the aluminides - Titanium Aluminide (Ti$_3$Al), Nickel Aluminide (NiAl), Iron Aluminide (FeAl), and Niobium Aluminide (NbAl$_3$) - The invention is also applicable to the manufacture/extrusion of shape memory alloys (SMA) such as Nickel - Titanium Alloys.

Both ferrous and non-ferrous materials may be used for the matrix material.

In other applications, the invention can be used to provide buffer (transition) layers. For example, austenitic stainless steel can be provided onto low alloy steel or martensitic steel components to enable improved deposition/adhesion characteristics for subsequent definition of (stellite) cobalt base alloy.

Although in most examples metallic materials will be used, the technique can be extended to non-metallic materials such as thermo plastics and in some cases amorphous materials such as glasses. Thus the friction extrusion technique is applicable to metallic powders including materials with particulate additions to produce metallic mixes of nominally immiscible material including for example MMC type materials. Furthermore the technique can be adapted to operate on metallic materials together with a second component which is substantially unchanged in passing through an extrusion port as in friction co-extrusion. In each case the required applied pressure and rates of rotation or relative movement are adapted to suit the material concerned to produce a significant plasticised zone which is extruded through one or more ports as desired.

In the simplest example, one of the members comprises a mould provided by a simple, planar substrate and the other member is a consumable member, the method further comprising causing relative transverse movement between the substrate and the consumable member so that the extruded matrix is laid down along the substrate.

In more complex arrangements, the mould may comprise an injection mould while the method can also be used to form tubes.

The consumable member may be surrounded by a bush which is free to rotate with the consumable member, and which is adapted to cause the flash generated in use to flow laterally outwardly.

The use of a bush, preferably a close fitting bush, enables a number of advantages to be achieved. Thus, a close fitting bush will form a more managable extruded flash which will be generally annular and thin. The bush will increase the load that can be applied at the edge of the consumable member onto the substrate. The bush can also be arranged to direct and present a thin extruded flash towards fixed cutting tools for flash removal. Furthermore, where there is relative traverse movement between the consumable member and the substrate, the flash will impart a smooth top surface to the deposited material. The bush is preferably close fitting and will typically be 0.1–0.9 mm or even up to 1.5 mm above the deposited surface thickness.

The invention can be performed under water or other fluids such as oil.

We have extended the principle behind the first aspect of the invention to a method of reforming a metallic member, the method comprising urging the member against a die while relatively rotating the member and die whereby resultant frictional heat generates a plasticised zone; and extruding the member through an opening in the die whereby passage of the member through the plasticised zone causes redistribution of any discontinuities or inhomogeneities.

Thus, the invention relates more generally to the friction extrusion of metallic members, including monolithic members such as aluminium, aluminium alloys, and the like.

BRIEF DESCRIPTION OF THE DRAWINGS

Some examples of methods in accordance with the present invention will now be described with reference to the accompanying drawings, in which:

FIGS. 1a–1d are schematic side views of a first example;

FIG. 2 is a side view, partly in section of a second example;

FIGS. 3A–3C are side views, partly in section of a third example illustrating three stages in the method;

FIGS. 9A and 9B illustrate an extrusion die, and a side view, partly in section of an eighth example respectively;

FIGS. 10 and 11 are views similar to FIG. 8 but of ninth and tenth examples;

FIG. 12 illustrates an example using two non-consumable members;

FIG. 13 illustrates an example using two consumable members;

DETAILED DESCRIPTION OF THE EMBODIMENT

Figure 4A:
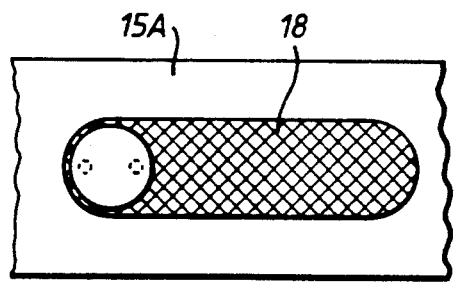
FIGS. 4A and 4B are a plan and side view respectively illustrating a fourth method in which the extrusion is laid down in an elongate form.
Figure 5A:
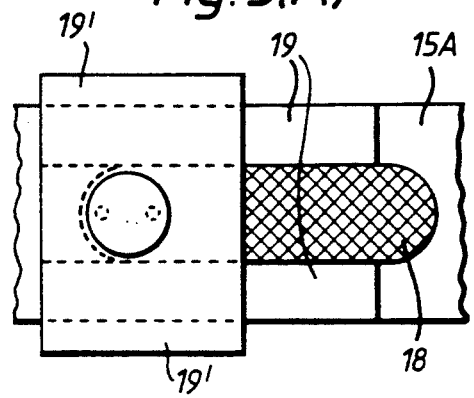
FIGS. 5A and 5B are views similar to those shown in FIGS. 4A and 4B but with the addition of side guides.

FIG. 1a shows a convenient arrangement where the compressed composite material 1 is carried in a cylindrical body or sleeve 2 into which a plunger or ram 3 is fitted and a load applied, while relative rotation is maintained, between the cylindrical body and plunger. Under suitable conditions of operation shear takes place generally close to the face of the plunger 3 while the majority of the compressed powder remains fixed with respect to the rotating body. Due to the applied load and maintained rotation, mechanical work is expended in the shear plane and the material is heated until a common plasticised layer 4 is developed.

Heated composite material exists in transition zones 4' on either side of the plasticised layer 4 but, since the heat conduction through the powder is poor compared with that of metals, the plasticised shearing layer tends to be of limited axial extent although developed substantially across the whole section.

On removing a plug or stop 5 in a port 6 of the plunger 3 through which the formed material is to be extruded and with the continued heating due to rotation under applied load, the plasticised layer substantially contacts the plunger, FIG. 1b after removal of an initial stagnant layer 1'. Thereafter a dynamic equilibrium is maintained with continued rotation under applied load and continued development of the plasticised layer through the powdered composite material together with the extrusion of the plasticised material through the port provided, FIG. 1c. This process is continued until substantially all the composite material has been consumed and formed into the extruded section with fine dispersion of the non-metallic components within the metal matrix, FIG. 1d. The extrusion 7 is then removed.

If desired, the extruded material 7 may be broken up into a powdered form and, if desired, mixed with further composite powder and the whole set up as in FIG. 1a, with the process continuing as in FIGS. 1b-1d, giving further refinement to the distribution of particles and further refinement of the metal matrix.

For relatively small diameter arrangements the plunger 3 may be provided with a central extrusion port 6. However, with larger diameter arrangements preferably a number of ports are provided arranged at a common radial distance around the centre axis. Yet again specially shaped nozzles may be provided whereby the plasticised material forms initially as a tube which is then further developed into a rod. In all cases the plunger is hollow to contain the extruded material.

Other arrangements of contra-rotating faces with compressed composite powder may be arranged and futhermore continuous feed systems used in which compressed powder under pressure is continuously fed into the stagnant zones which in turn become the shearing plasticised layer prior to extrusion through suitable ports or dies.

Although the power required to maintain the plasticised layer at a suitably elevated temperature may be derived entirely from the torque required and rotational speed of the contra-rotating members 2, 3, other methods can be employed to supplement this mechanical heating. For example an electric current can be passed through one or other or both members 2, 3 and out via the extrusion to help maintain adequate forging temperatures in the extruding material which lies outside the immediate zone of mechanical shear. Likewise the members 2, 3, can be preheated by any convenient means. Yet again induction heating inducing a relatively high frequency alternating current in the vicinity of the plasticised zone may be employed to assist the extrusion.

Although in practice a wide range of rotational speeds can be utilised (and the rate of extrusion is an inverse function of the rotational speed), it is preferred to use relatively low rotational speeds once the process has been satisfactorily initiated in order to increase the rate of extrusion under conditions of substantially adiabatic shear. At higher speeds the plasticised layer tends to act as an hydrostatic bearing and the rate of extrusion is greatly reduced. In one method of operation the members 2, 3 are initially rotated at a moderate speed, and as the plasticised layer develops the speeds are reduced to increase the rate of extrusion up to the desired limiting rate. However, at yet lower speeds the process tends to break down with rupture of the common plasticised zone. The optimum speed for rapid extrusion lies in the range of 20% to 50% above the critical speed below which the process ceases to be stable. However, yet higher speeds may be selected for particular product characteristics such as fine grain and/or even dispersion.

In the above example both members 2, 3 are non-consummable. However, other arrangements using consummable members are possible as shown in FIGS. 2 to 11, 13 and 18. In FIG. 2 a plasticised zone 9 is formed between one end of a rotating consumable bar 10 and a stationary die or mould 11 in which an extrusion bar of the desired cross-section is formed. Preferably for symmetry of dispersion the bar 10 contains more than one counterbore 12, 13 filled with the desired particulate and equally more than one extrusion port 14 (only one shown) is provided arranged symmetrically about the axis of the rotating bar. The die 11 has a tapered bore ill to accommodate flash. Again supplementary heating can be applied to maintain adequate plasticities in the plasticised material and its initial extrusion.

In yet a further arrangement (FIG. 3) the mould 15 is separated into two parts 15A, 15B with one part 15A maintaining a fixed position with respect to the end of the rotating bar 16 and the other part 15B maintaining a fixed position with respect to the extruded (i.e. formed) MMC 17. As shown in FIG. 3A the process is initiated by rotating the parent material 16 with its particulate content under load against the mould 15, with the supplementary heating as required, to form an initial plasticised layer. This layer is then built up (FIG. 3B) to a desired amount after which the two parts of the mould or die are separated (FIG. 3C) as the MMC is extruded at substantially the full diameter of the rotating bar. It is noted that the exposed end of the MMC normally requires further support and preferably some degree of forced cooling in order to maintain sufficient mechanical strength to react the end load applied to the rotating bar.

Although the process may be operated under ambient conditions it is preferable to protect the plasticised zone and extrusion from atmospheric contamination using a non-reacting gas such as nitrogen or an inert gas such as argon. Alternatively for some materials the process may be operated in a vacuum.

In a further variation of the system (FIGS. 4 and 5) the part of the mould not containing the rotating bar may be translated sideways causing an extruded layer 18 of the MMC to be deposited as a wide relatively thin layer. This layer may be built up into a thicker layer by a subsequent pass over the previously deposited layer until the total desired thickness is obtained. Preferably cheeks 19 (FIG. 5) and a fixed die 19' are provided to maintain the material in the width dimension as it is being formed along the lengths of the deposits. The deposit may be laid on a non-miscible material such as ceramic or on a suitable metallic surface from which it can be detached and any undesired traces of the metal removed by machining or grinding the undersurface of the MMC so deposited.

The MMC produced by the above techniques may be further shaped by hammering or rolling at elevated temperature using well known methods in the field of metal forming.

Typical operating conditions for a 25 mm diameter metal bar include rotating speed of 400 to 800 rpm with an applied load of 20 to 60 kN depending upon the rate of extrusion required and the hot strength of the material. The operating conditions are normally not critical and can be readily established by practical experiment. In changing the dimensions of the rotating bars the applied pressure per unit cross-section of the bar can be maintained approximately constant and the rotating speed adjusted to give the same peripheral velocity which is then modified to give the desired rate of extrusion. Equally supplementary heating can be applied to reduce the requirement on mechanical work in driving the rotating bar or the required applied load to give the desired extrusion characteristics. Electric methods of heating (resistance or induction) are readily applied for operation in controlled atmospheres or in vacuum.

FIG. 6 illustrates four different cross-sections for the consumable member which provides further alternatives for those shown in FIGS. 2-5. In each case, the centre of the bore 80 for ceramic material may be offset slightly or greatly from the axis of the consumable member.

Figure 7:
FIG. 7 is a side view, partly in section of a sixth example.

In the previous examples, the consumable bar has been rotated relative to a fixed die. FIG. 7 illustrates an alternative arrangement in which a consumable member 30 similar to the bar 10 of FIG. 2 is held fixed while a die 31 is rotated. The extruded material exits through a bore 32 in the die as before.

Figure 8:
FIG. 8 is a side view, partly in section of a seventh example.

FIG. 8 illustrates a further example in which the die previously used is replaced by an injection mould 33. In this case, the consumable member 30 is rotated while the mould 33 is held stationary. A stationary die 34 is mounted on the mould 33 and extruded material flows into a bore 35 in the mould 33. An air vent 50 communicates with the bore 35 through the mould 33.

Figure 9A:
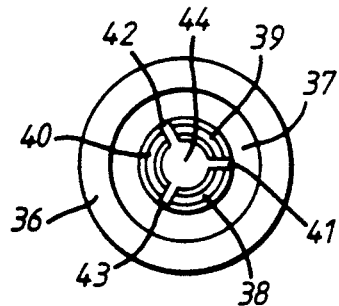

The invention can also be used to form tubes and in particular seamless tubes by making use of a special form of die as shown in FIG. 9. In this case, a die 36 is provided which rotates relative to the fixed consumable 30. The die has a conical entrance opening 37 terminating in three, part annular bores 38-40 defined between three webs 41-43 spaced substantially equally, circumferentially about a central member 44. The bores 38-40 taper towards the bottom of the die 36 and this has the effect of enabling the separate extrusions from the bores 38-40 coalescing to form a seamless tube 45.

Figure 10:

FIG. 10 illustrates a further example in which a fixed die 51 is provided having a central bore 52 opening into an outwardly tapering bore 53. A consumable member 54 similar to the previously described consumable member has initially a forwardly tapering section 55 which is received within the tapering bore 53. The consumable member 54 is rotated while being urged against the die 51 causing a metal matrix composite 56 to be extruded through the bore 52.

FIG. 11 illustrates a further example similar to the FIG. 10 example but in this case a die 57 is provided which is rotated while the consumable member 54 remains stationary. In addition, the die 57 is urged upwardly as seen in the drawing. FIG. 12 illustrates a further example in which two non-consumable members 60, 61 are provided with similar faces or discs 62, 63 bearing on a powder mix 65 contained within chamber 64. The non-consumable bars 60, 61 and facing discs 62 and 63 are urged together and rotated in opposite directions to generate frictional heat in the powder material 65. This arrangement can be considered a double ended or symmetrical variation of the cup and plunger arrangement of FIG. 1 together with extrusion from one or more ports in a radial direction in the semi enclosing chamber 64. The extrusion ports 66 are shaped in cross section according to the shape desired of the extruded material 67.

In operation the plasticised layers formed by the contra rotating faces 62, 63 coalesce in the central region and are extruded through the port 66. If desired electric current can be passed between the rods 60 and 61 and discs 62 and 63 to provide resistance heating of the powdered material 65 within an insulating chamber 64. Alternatively induction heating methods can be used to heat the operating zone.

In all cases the powdered material 65 may comprise metals or alloys in a granular or finely powdered form together with if desired further particulates such as ceramics or diamond particles which become dispersed in the common plasticised zone formed between the faces 62, 63 in the material 65 and which are extruded 67.

In some cases further powder material can be supplied via the rotating rods 60, 61 through suitable ports (not shown) in the faces 62, 63 either as a separate operation or semi-continuously while load and contra rotation are applied simultaneously to the mix 65. Preferably the faces 62, 63 are of material or are so coated so as to reduce the tendency to alloy with the material 65. Furthermore, vanes or ridges can be formed on the inner faces of the discs 62, 63 so as to tend to retain the powdered material such that a shear plane of the plasticised material tends to develop away from the immediate face of the contra rotating discs 62, 63.

Where the common interface does not lie centrally with respect to the retaining sleeve 64 as detected for example by thermo-couples attached to the sleeve on either side of the central zone, then the rotational speed of one member can be altered with respect to the other to adjust the position of the common plasticised zone.

FIG. 13 shows an example where two consumable bars 71, 72 of substantially the same diameter are brought into contact one with the other and rotated in opposite directions while applying an axial load. The bars have counterbores 73, 74, and 75, 76 respectively in radially offset positions parallel with the axis of the metal bars and filled with the desired particulate preferably as a compressed granular powder. With continued rotation and applied load the common interface is heated to a temperature approaching the melting point of the parent metal of the bars 71, 72 at which stage the zone between the solid rotating bars develops as a plasticised zone which is being continuously sheared. Under the influence of the applied load this plasticised zone is extruded radially tending to form a broad collar about the contra-rotating bars 71, 72 in which the collar contains a much more even distribution of the particulates in the metal matrix than represented by the parent materials.

The extruded material is shaped into nominally rectangular or circular form by means of a close fitting mould 77 about the zone 78 where the plasticised material is being extruded. Preferably to maintain symmetry the parent stock is counterbored in more than one place (as shown) at a given radius in the cross-section of the metal bar and equally the mould carries more than one extrusion orifice symmetrically about the axis of the rotating bars although this is not essential.

To initiate the process the contacting bars 71,72 may be tapered at their mating ends to produce a limited area for initial contact to assist the formation of the common plasticised zone. Yet again current can be passed through the mating bars to assist the heating of the initial contact area and/or high frequency induction methods utilised. In all these cases the objective is to enable the plasticised material to flow away from the contra-rotating bars and be extruded through the mould in the desired form.

In operation the mould 77 may be free floating between closely adjacent stops (not shown) so that it self centres on the extruding material emanating from between the contra-rotating bars. If required the speed of one or other bar can be adjusted so as to maintain the plasticised zone symmetrically in the central area. Conveniently the limited movement of the mould between the stops can be utilised in a feedback mechanism to adapt the speed of one bar with respect to the other to maintain symmetrical operation.

In all the examples of consumable members these may comprise a metal shroud or sheath for the majority component of say an MMC product together with one or more inserts of the required additional components which may be powered or granulated particulate together with further metallic alloys according to requirements.

In the simplest case the outer or major component 80 (FIG. 14) is a formable, extrudable or machinable metallic alloy, such as mild steel or an aluminium alloy, the properties of which are to be enhanced. This component is in the form of a thick walled tube with a central hollow bore 81 into which the further component or components such as ceramic core wire 82 are added. FIG. 15 shows a modification in which a number of off axis bore holes are provided, each filled with ceramic core wire 83. FIG. 16 illustrates a consumable with a single off axis bore 81'. Likewise a variety of bore shapes may be utilised.

Any combination of these arrangements may be employed as desired. For example the outer component can be a round bar with one or more bores which are filled with other metallic materials and/or particulates. The additional metallic component may be a single virtually pure metal or alloy, or may be a partially sintered material or a fully sintered and compacted material. The particulate may be in granulated or powdered form, or may be part of the sintered material or both.

These and other variations are within the scope of the inventions, whereby, by means of generating a plasticised zone by relative motion under applied load, a combination material is produced such as a non-miscible alloy or an MMC material. In particular the plasticised zone or amalgum can be separately extruded, or deposited into a substrate such as by so called friction surfacing (as described above).

Figure 4B:
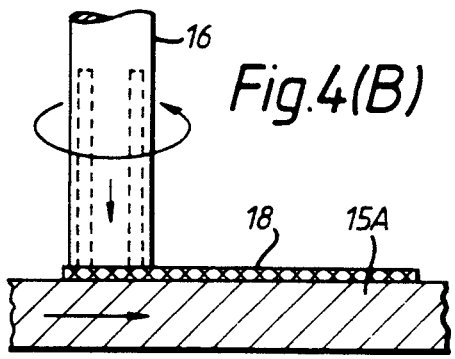
Figure 5B:
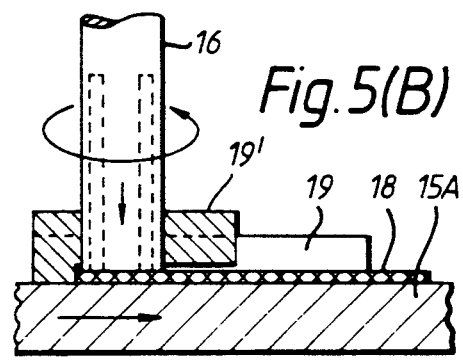
Figure 6A:
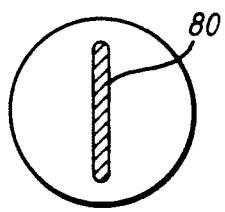
FIGS. 6A–6D illustrate four possible cross-sections of the consumable.
Figure 6B:
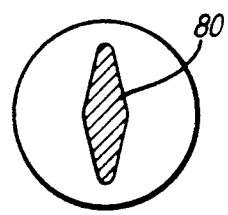
Figure 6C:
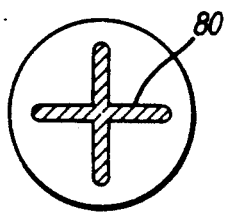
Figure 6D:
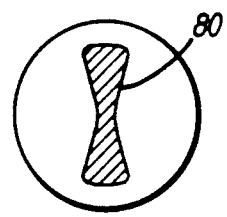
Figure 17:
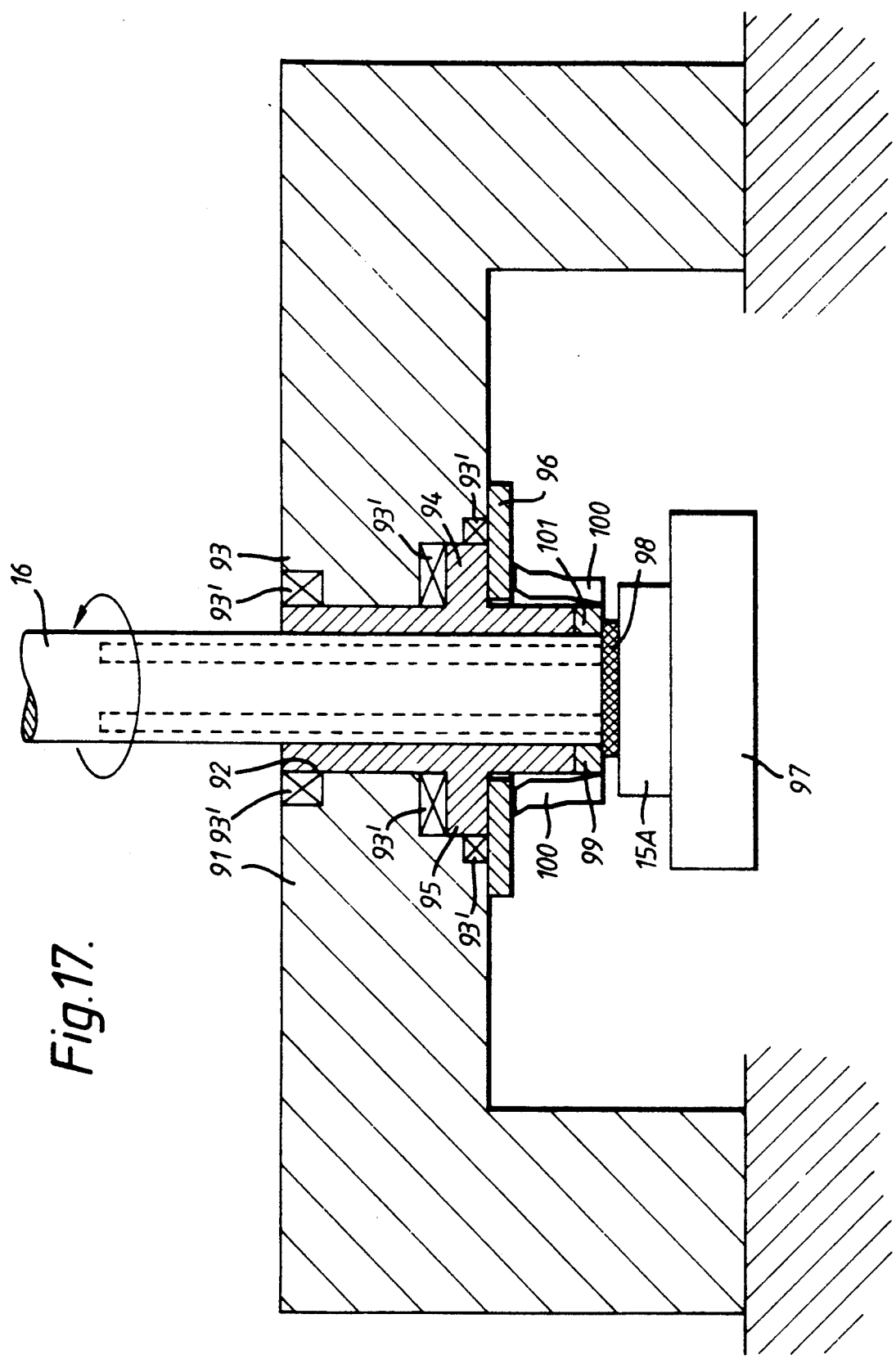
FIG. 17 illustrates the use of a bush.

FIG. 17 illustrates a modification of the apparatus shown in FIG. 4 in which the consumable 16 is mounted to a portal frame support 91 with a central bore 92 in which is mounted a guide bush 93 via suitable bearing 93'. The bush 93 is secured against axial movement by an annular flange 94 received in a counterbore 95 in the frame 91 and an annular retaining plate 96 secured to the underside of the frame support 91, but is free to rotate. The bush 93 may be made of molybdenum or ceramic for relatively hard deposit material, cobalt base alloys of H13 tool steel for relatively soft deposit material.

A traverse table 97 is mounted beneath the frame support 91 and is moveable beneath the bore 92 and carries the substrate 15A in use.

In operation, the consumable member 16 is rotated in a conventional manner by a device not shown while being urged against the substrate 15A. Rotation of the consumable member 16 causes heat to build up at the interface between the consumable member and the substrate with the result that material transfers from the consumable member 16 to the substrate to form a MMC deposit 98. At the same time, the traverse table 97 is actuated so that the substrate 15A is slowly traversed beneath the consumable member 16 producing an elongate deposit.

During operation, flash is produced at the sides of the deposit but due to the presence of the bush 93, this flash 99 will be relatively thin and will be guided under a pair of cutting tools 100 positioned on opposite sides of the MMC deposit 98 which will periodically be actuated to remove the flash. Alternatively, the cutting tools 100 could be arranged continuously to remove flash during operation.

During the traverse movement, the bush 93 also smooths the surface of the deposit 98.

It will also be noted in the drawing that the lower section of the bush 93 is formed as a heat/wear resisting material 101.

Figure 18:
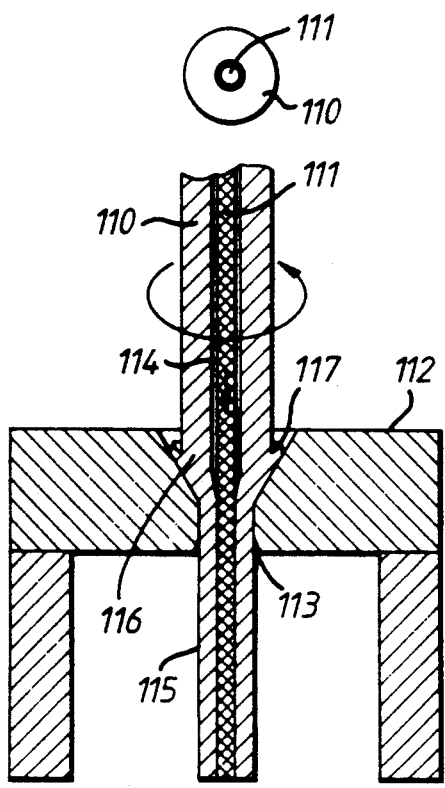
FIG. 18 illustrates an example of co-extrusion.

In a yet further alternative here termed friction co-extrusion the consumable bar may comprise more than one component such that at least one component is not significantly altered or caused to be subject to rotational shear in the plasticised zone in the region leading to the extrusion port. Thus as shown in FIG. 18 which may be considered a variant of FIGS. 10 and 11, the consumable bar 110 has a further component 111 in this case as a central core. The outer component 110 comprises a metallic material or alloy with or without further particulate added or other material inserted in a manner analogous that shown in FIGS. 10 or 11. The combined consumable 110, 111 is rotated and pressed against a die 112 such that it becomes extruded through an orifice 113. As normally employed the frictional extrusion takes place at a temperature below the melting point of the core 111 which remains virtually unchanged and does not form part of the frictional shear face or plasticised zone 116. The resulting extrusion 115 comprises the outer component 110 together with any particulate if present together with the inner core 111 formed of the original core material. The die 112 and orifice 113 can be of any convenient shape such that the external part of the extrusion 115 takes up the shape of the orifice 113 in cross section while the inner core 111 remains substantially unchanged. Preferably the core 111 is loosely attached to the outer component 110 as achieved by boring the latter and inserting a core of slightly smaller diameter down the bore hole leaving a clearance 114.

In operation the outer material is extruded while the bore material passes through the centre of the extrusion to result in a substantially co-axial clad billet 115. During the operation a flash of excess material 117 develops in the mouth of the die 112. For relatively short lengths of extrusion the flash 117 can be allowed to form freely, but for longer lengths it is preferable to machine off the flash 117 as it is being formed to prevent an excessive accumulation in the mouth of the die 112. As an example the friction co-extrusion process may be applied to a relatively low strength material such as an aluminium alloy with or without particulate inserts and with a central core of material of significantly higher melting point such as mild steel or stainless steel or the like. The extrusion then comprises the outer aluminium alloy material which has been friction extruded via the plasticised zone 116 together with the inner core 111 of mild or stainless steel. In this case the core acts to provide for example increased tensile strength at elevated temperature such as 400° C.

Figure 14:
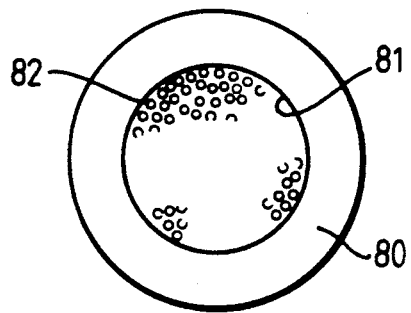
FIGS. 14 to 16 are cross-sections through three examples of consumable members.
Figure 15:
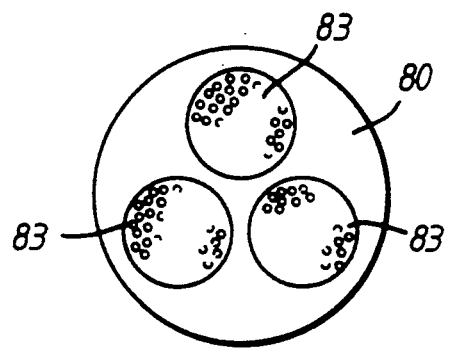
Figure 16:
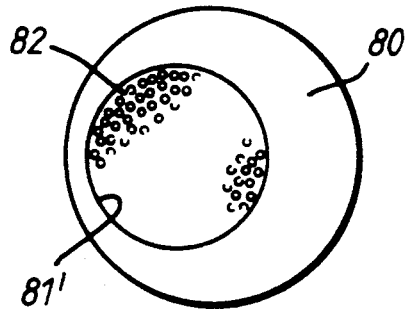

The core 111 need not be solid but can be hollow or filled with rods of fluxed cored material as in FIGS. 14 to 16 as long as its compressive strensth is sufficient to withstand the pressure of the extrusion operation and avoid complete disruption or collapse of the core. The core may serve to strengthen or support the overall extrusion 115 particularly where the outer material 110 is of low strength material or alternatively the outer material may serve to support or protect the inner core particularly where the latter is in a form of a powder filled tube or collection of cored wires as in FIGS. 14 to 16.

In a further variation the core may comprise more than one component distributed symmetrically about the centre of the outer material 110. Where for example three cores of relatively small diameter are distributed symmetrically about the centre these may be partially formed into a helix as the core material passes through the plasticised zone 116 although each individual core is substantially unchanged or not disrupted in itself. The resulting extrusion 115 then shows three spirally wound components corresponding to the three original cores 111.

In some instances fibre materials such as carbon fibres can be distributed in the outer or sheath material 110 such that the fibres become disrupted in the plasticised zone 116 and are no longer identifiable as continuous fibres. Here the material is unchanged in itself although broken up into short fibres and dispersed within the outer material 110 as it is extruded as a combined or composite structure 115. These and other variations in geometry are within the scope of the invention generally defined as friction co-extrusion.

Figure 19:
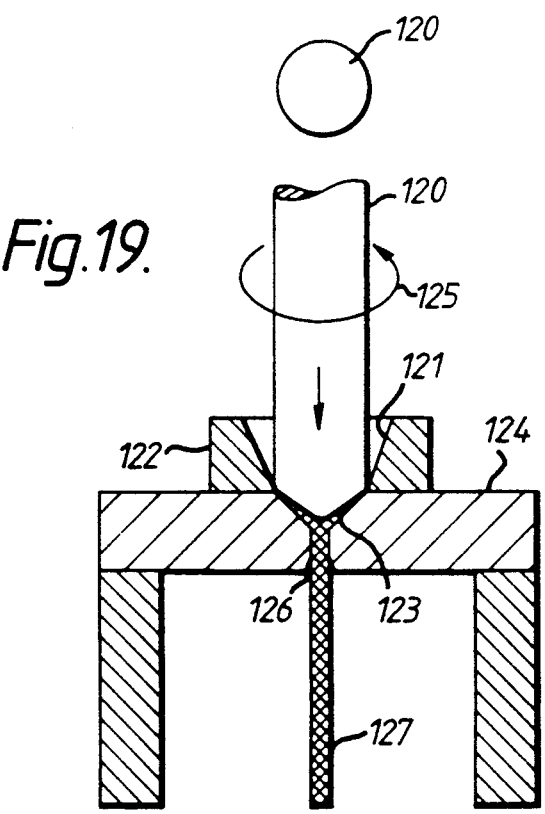
FIG. 19 illustrates an example of friction extrusion of a monolithic rod.

The examples described so far illustrate the formation of matal matrix composite extrusions. As explained above, the invention is more generally applicable to the reforming of both composite and non-composite or monolothic members. FIG. 19 illustrates an example of the friction extrusion concept in which an aluminium rod 120 is urged through a tapered bore 121 in a bush 122 into a tapered bore 123 of a die 124. The die 124 is fixed while the rod 120 is rotated in the direction of an arrow 125 to generate frictional heat at the interface between the die and the rod. This frictional heat plasticises the rod material which is then extruded through a bore 126 communicating with the tapered bore 123 to form an extrusion 127. It has been found that the grain structure in the extrusion 127 is much more uniformly distributed across 70% or more of the diameter of the extrusion than in the original rod 120. Flash generated during this process is accommodated by the tapered bore 121.

We claim:

1. A method of forming or reforming a metallic composite material, the method comprising relatively rotating a pair of members while urging them together under pressure so as to mix or remix together the materials making up the composite, the urging direction being substantially parallel with the axis of relative rotation; and extruding the composite.

2. A method according to claim 1, wherein both said members are non-consumable, said materials making up said composite being provided between said members.

3. A method according to claim 2, wherein one of said members comprises a sleeve or cap and the other comprises a plunger fitting within the sleeve or cap.

4. A method according to claim 1, wherein one of said members is a consumable member incorporating the materials making up said composite.

5. A method according to claim 4, wherein said consumable member comprises a parent material and a particulate material, whereby the extrusion comprises a resulting matrix of the parent material.

6. A method according to claim 4, wherein said consumable member is surrounded by a bush.

7. A method according to claim 1, wherein said composite is extruded through an opening in one of said members, the method further comprising separating the extrusion from said one member.

8. A method according to claim 1, wherein one of said members comprises a die.

9. A method according to claim 8, wherein the die causes the composite to be extruded in the form of a tube.

10. A method according of claim 1, wherein one of said members comprises a mould.

11. A method according to claim 10, wherein one of said members is a consumable member incorporating the materials making up said composite, and wherein said mould comprises a planar substrate, the method further comprising causing relative transverse movement between said substrate and said consumable member so that the extruded matrix is laid down along said substrate.

12. A method according to claim 10, wherein said mould comprises an injection mould.

13. A method according to claim 1, wherein both members comprise consumable members, each member having a central bore wherein juxtaposed ends of the members are urged together and relatively rotated, the composite being extruded through one or both of the central bores.

14. A method according to claim 1, wherein both members comprise consumable members, and wherein the members are urged together and relatively rotated with a mould being provided around the interface between the members for shaping the extruded material.

15. A method of reforming a metallic member, the method comprising urging the member against a die while relatively rotating the member and die whereby resultant frictional heat generates a plasticised zone; and extruding the member through an opening in the die whereby passage of the member through the plasticised zone causes redistribution of any discontinuities or inhomogeneities.

16. A method of reforming a metallic member, the method comprising urging the member against a die while relatively rotating the member and die whereby torsional shear takes place within a zone extending through at least part of the cross-section of the member; and extruding the member through an opening in the die whereby parent material is redistributed prior to the extrusion stage.

17. A method according to claim 16, wherein the zone extends over substantially 70% of the cross-section of the member.

18. A method according to claim 17, wherein the zone extends over the full diameter of the member.

* * * * *